Patented Aug. 7, 1934

1,969,491

UNITED STATES PATENT OFFICE 1,969,491

INSECTICIDE

Elmer W. Adams, Hammond, Ind., assignor to Standard Oil Company, Whiting, Ind., a corporation of Indiana No Drawing. Application September 12, 1928, Serial No. 305,614

11 Claims. (Cl. 167—43)

The present invention relates to insecticides and more particularly those suitable for use as anti-parasitic sprays for the treatment of fruit trees, plants, and the like.

In accordance with the present invention, a light petroleum oil, such as straw oil or the like, is admixed with a suitable proportion of a sulfonic compound derived from the treatment of hydrocarbon oils, particularly lubricant oils, with concentrated or fuming sulfuric acid. The proportion of the sulfonic compound, which may be a sulfonic acid or a neutral soluble salt thereof, such as the sodium salt, may be from one-ninth to one-third of the proportion of oil employed. To the mixture a small amount of a soap, such as a resin or fatty acid soap, may be added, if desired, the proportion of soap employed being suitably from one-tenth to one-third the proportion of sulfonic compounds used. Small proportions of other constituents, such as water, denatured alcohol, preservatives, or other materials, may be added to the mixture. A small quantity of creosote, suitably between 0.1% and 5% is incorporated in the product.

It has been found that the addition of creosote in small quantities has a remarkable effect upon the efficacy of the insecticide. The composition without the addition of creosote, when used in the manner described below, is remarkably effective against scales such as San Jose and Oyster Shell, apparently penetrating the scale and destroying the eggs of the parasite so that not more than about 5% will hatch. When the composition including creosote is used, it is found that the percentage of eggs hatched is less than half that obtained with the same composition from which the creosote has been omitted.

An addition of about 0.5% of creosote to the composition seems to be the optimum quantity. Larger quantities, for example up to 5%, may be employed, but without very substantial improvement. Smaller additions, of the order of 0.1% exhibit beneficial results.

The composition may suitably be constituted as follows:

| | |
|---|---|
| Preferentially oil soluble mineral oil sulfonates (50% oil) | 20% to 10% |
| Soda resin soap | 3.5% to 2% |
| Water | 1.0% to 2.0% |
| Alcohol | 0.6% to 1.2% |
| Straw oil | 75% to 85% |
| Creosote | 0.1% to 5% |

The preferred composition is constituted as follows:

| | |
|---|---|
| Preferentially oil soluble mineral oil sulfonates (50% oil) | 14.5% |
| Soda resin soap | 2.8% |
| Water | 1.4% |
| Alcohol | 1.0% |
| Straw oil | 79.8% |
| Creosote | 0.5% |

Such a product emulsifies immediately when mixed with water, and for use as a dormant spray is thus diluted until it constitutes between about 2% and 10% of the emulsion.

Instead of the preferentially oil soluble sulfonates derived from mineral oil, I may employ the preferentially water soluble sulfonates derived from mineral oil or naphthenates derived from treatment of naphthenic oils with dilute solutions of alcohol.

I claim:

1. A composition capable of forming a stable emulsion with water and effective as an anti-parasitic spray for plants and trees, comprising a light petroleum oil, preferentially oil soluble sulfonates derived from sulfuric acid-treated mineral oil, and a small amount of creosote.

2. A composition capable of forming a stable emulsion with water and effective as an anti-parasitic spray for plants and trees, comprising a light petroleum oil, a salt of preferentially oil soluble sulfonates derived from sulfuric acid-treated mineral oil, a small amount of creosote, and a water-soluble soap.

3. A composition capable of forming a stable emulsion with water and effective as an anti-parasitic spray for plants and trees, comprising a light petroleum oil, preferentially oil soluble sulfonates derived from sulfuric acid-treated mineral oil to the amount of one-ninth to one-third of the oil, a small amount of creosote, and a water soluble soap.

4. A composition capable of forming a stable emulsion with water and effective as an anti-parasitic spray for plants and trees, comprising a light petroleum oil, a salt of a preferentially oil soluble sulfonic acid derived from sulfuric acid treated mineral oil to the amount of one-ninth to one-third of the oil, a small amount of creosote, and a water soluble soap.

5. A composition capable of forming a stable emulsion with water and effective as an anti-parasitic spray for plants and trees, comprising between 20% and 10% of preferentially oil soluble sulfonates derived from sulfuric acid treated mineral oil, between 3.5% and 2% of a water soluble soap, between 75% and 85% of straw oil, and between 0.1% and 5% of creosote.

6. A composition capable of forming a stable emulsion with water and effective as an antiparasitic spray for plants and trees, comprising 14.5% of preferentially oil soluble sulfonates derived from sulfuric acid treated mineral oil, 2.8% of a water soluble soap, 1.4% of water, 1.0% of alcohol, 79.8% of straw oil, and 0.5% of creosote.

7. A composition capable of forming a stable emulsion with water and effective as an antiparasitic spray for plants and trees, comprising a light petroleum oil, preferentially oil soluble sulfonates derived from sulfuric acid-treated mineral oil, and less than 4% of creosote.

8. A composition capable of forming a stable emulsion with water and effective as an antiparasitic spray for plants and trees, comprising a light petroleum oil, a salt of preferentially oil soluble sulfonic acid derived from sulfuric acid-treated mineral oil, less than 4% of creosote, and a water soluble soap.

9. A composition capable of forming a stable emulsion with water and effective as an antiparasitic spray for plants and trees, comprising a light petroleum oil, preferentially oil soluble sulfonates derived from sulfuric acid-treated mineral oil to the amount of one-ninth to one-third of the oil, less than 1% of creosote, and a water soluble soap.

10. A composition capable of forming a stable emulsion with water and effective as an antiparasitic spray for plants and trees, which consists of a light petroleum oil, preferentially oil soluble sulfonates derived from sulfuric acid-treated mineral oil, and a small amount of creosote.

11. A composition capable of forming a stable emulsion with water and effective as an antiparasitic spray for plants and trees, which consists of a light petroleum oil, preferentially oil soluble sulfonates derived from sulfuric acid-treated mineral oil, a water soluble fatty acid soap, and a small amount of creosote.

ELMER W. ADAMS.